UNITED STATES PATENT OFFICE.

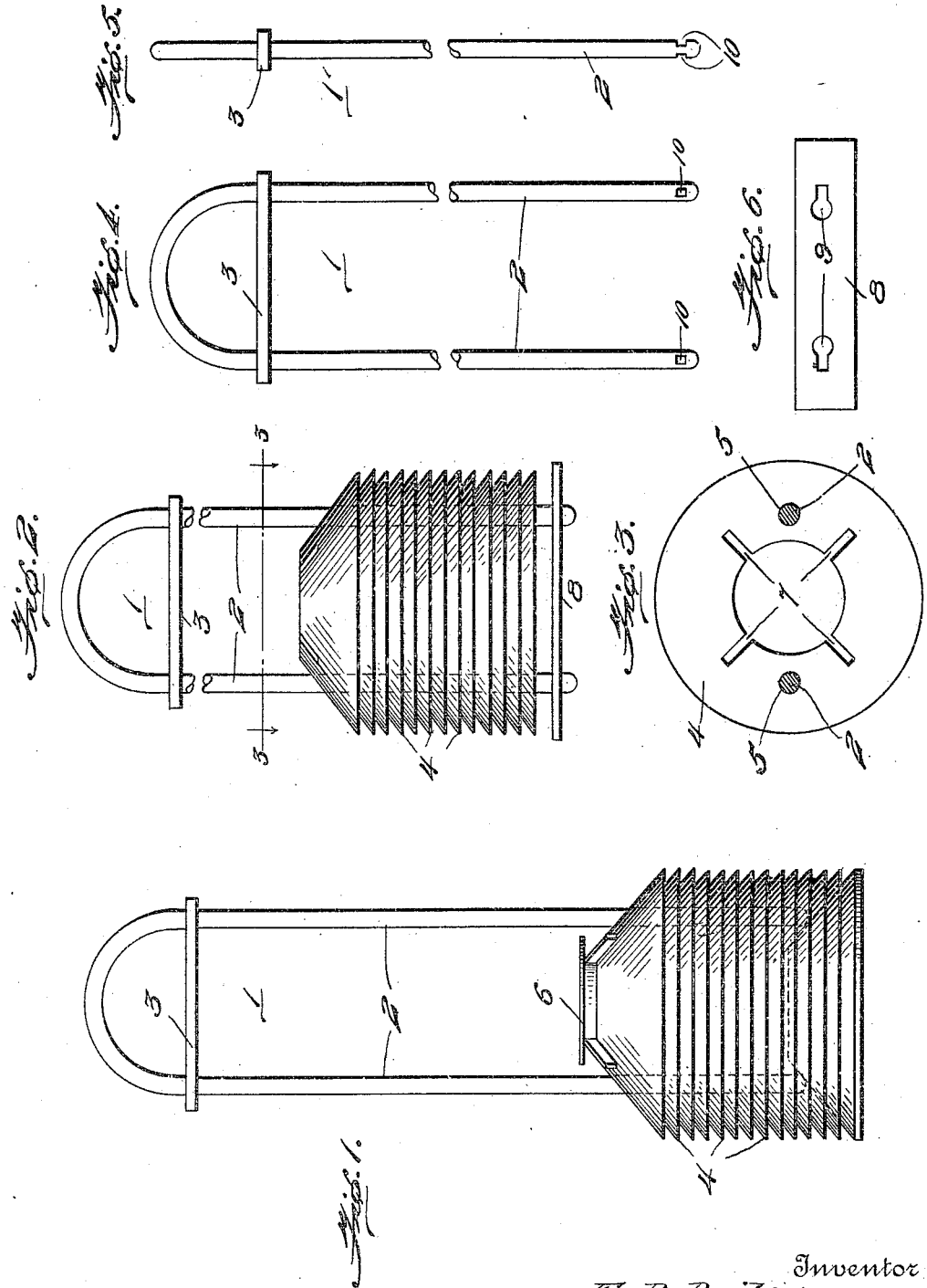

EDGERLY R. BAILEY, OF CLARINDA, IOWA.

DEVICE FOR ASSEMBLING PARTS OF A CENTRIFUGAL SEPARATING-BOWL.

959,693. Specification of Letters Patent. Patented May 31, 1910.

Application filed December 14, 1908, Serial No. 467,502. Renewed November 26, 1909. Serial No. 530,006.

*To all whom it may concern:*

Be it known that I, EDGERLY R. BAILEY, a citizen of the United States, residing at Clarinda, in the county of Page and State of Iowa, have invented certain new and useful Improvements in a Device for Assembling Parts of a Centrifugal Separating-Bowl; and I do declare the following to be a full, clear, and exact description of the invention, such as will enable others skilled in the art to which it appertains to make and use the same.

My invention relates to the class of centrifugal liquid separators wherein the interior of the bowl or separating device is provided with a series of disks which subdivide the interior of the bowl into a plurality of strata both radially and vertically by means of conical disks. These disks may be supported in the usual or any desired manner and are here shown as supported by a plurality of radial wings or blades on a tubular core in the bowl of the separator.

The object of the invention is to provide ready means for removing the disks from their supports in such a way that they will be kept in their proper order or relative positions and so that they may be easily moved apart for cleaning and then reassembled around the support within the bowl.

With this and other objects in view, the invention consists of certain novel features of construction, combination and arrangement of parts as will be more fully described and particularly pointed out in the appended claims.

In the accompanying drawings, Figure 1 is a side view showing the device in engagement with the disks prior to the removal of the same from the separator bowl; Fig. 2 is a similar view showing the disks removed from the bowl and from their supports and secured in position on the holding device ready for cleaning; Fig. 3 is a horizontal sectional view on the line 3—3 of Fig. 2; Fig. 4 is a side view of the disk holding and supporting device; Fig. 5 is an edge view of the same; and Fig. 6 is a plan view of the disk retaining plate which is applied to the ends of the holder to prevent the removal of the disks therefrom.

Referring more particularly to the drawings, 1 denotes the disk holding and supporting device which consists of a bar which is bent mid-way between its ends to form parallel disk engaging arms 2, which are held in operative position by a spacing bar 3 which is arranged thereon adjacent to the inner connected ends of the arms as shown. The separator disks 4 are each provided with oppositely disposed apertures 5 which when the disks are in operative position on their support 6 will be in alinement. The disks 4 are frusto-conical in shape and are provided at their upper ends with radial notches 7 to receive the radial wings or blades on the tubular support 6 when the disks are arranged thereon in position for use. When it is desired to remove the disks from the separator for cleaning or other purposes, the free ends of the arms 2 are inserted through the alined apertures 5 in the disks. After the arms have been thus engaged with the disks, they may be lifted out of the separator bowl and out of engagement with their supporting core without separating the disks or changing their relative positions. After the disks have been thus removed from the bowl and supporting core, the projecting ends of the arms 2 are engaged with a retaining plate 8, said plate being provided adjacent its outer ends with key-hole slots 9 with which the ends of the arms are engaged, said ends being provided on opposite sides with recesses or notches 10 with which the reduced portions of the key-hole slots are engaged thereby securing the retaining plate in position to hold the disks on the arms 2.

In engaging the ends of the arms with the slots 9 in the retaining plate, said ends are sprung together to engage the enlarged portions of the key-hole slots, after which, upon release of the arms, said ends will spring into the reduced portions of the slots, thereby securing the retaining plate in place. After the disks have been thus secured on the holder, they may be slipped apart or separated on the supporting arms 2 thus facilitating the cleaning thereof. After the disks have been cleaned, the retaining plate is disengaged from the ends of the arms 2 by springing the latter together in the manner hereinbefore described, after which the holding device and the disks are placed in position in the separator and the disks allowed to drop on to their supporting core. In replacing the disks on the support that holds them within the bowl, the support itself may either be pushed through the disks while they are held upon the holder and the latter then withdrawn or the holder containing the disks may be placed in the bowl so as to register the radial notches of the disks with the wings of the supporting shaft within the bowl and the disks allowed to drop into place on said support.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim as new and desire to secure by Letters-Patent is:

1. In a centrifugal separator, having a series of apertured disks or plates, an assembling and disassembling device comprising a plurality of spring metal arms adapted to be passed through the apertures in said disks whereby the latter are removed from the separator and held in their relative positions, a spacing bar to hold said arms in position to pass through the apertures of said disks or plates and means to prevent the casual disengagement of the disks from said holding arms after being removed from the separator.

2. A device for assembling and disassembling the disks or plates of a centrifugal separator of the character described comprising a plurality of spring rods spaced apart and having in their outer ends notches or recesses, a disk retaining plate having formed therein key-hole slots adapted to be engaged by the notched ends of the arms whereby said plate is secured to the arms to hold said disks in place thereon.

3. A device for assembling and disassembling the disks or plates of a centrifugal separator of the character described comprising a plurality of spring rods or arms, a spacing bar arranged on said rods or arms to hold the same in proper position to be engaged with the disks, a retaining plate adapted to be engaged with the free ends of said arms to hold the disks in their relative positions thereon, and means whereby said plate is secured to the ends of the arms.

4. A device for assembling and disassembling the disks of a centrifugal separator comprising a spring metal bar bent upon itself to form disk engaging and supporting arms, a spacing plate arranged on said arms adjacent to their connected ends whereby the arms are held in proper position for engagement with the disks, and a disk retaining plate adapted to be engaged with the free ends of the arms to hold the disks in position thereon.

5. In a centrifugal separator having a series of apertured disks or plates, an assembling and disassembling device comprising a plurality of spring metal arms adapted to be passed through the apertures in said disks whereby the latter may be removed from the separator and held in their relative positions, a spacing bar to hold said arms in position to pass through the apertures of said disks or plates, and a retaining plate adapted to be engaged with the free ends of said arms to hold the disks in position thereon.

In testimony whereof I have hereunto set my hand in presence of two subscribing witnesses.

EDGERLY R. BAILEY.

Witnesses:
J. E. ANMAN,
T. A. WILSON.